(12) United States Patent
Nair et al.

(10) Patent No.: US 10,428,952 B1
(45) Date of Patent: Oct. 1, 2019

(54) MECHANICAL ROTARY HYDRAULICALLY COOLED SEAL, ROLLER SUPPORT, AND DRIVE FOR THERMAL KILN RETORTS

(71) Applicant: Pyrodyne Thermal, LLC, Albuquerque, NM (US)

(72) Inventors: Keith Denton Nair, Bristol (GB); Daniel Christien Spokes, Newent Gloucester (GB)

(73) Assignee: Pyrodyne Thermal, LLC, Albuquerque, NM (US)

( * ) Notice: Subject to any disclaimer, the term of this patent is extended or adjusted under 35 U.S.C. 154(b) by 136 days.

(21) Appl. No.: 15/457,636

(22) Filed: Mar. 13, 2017

Related U.S. Application Data

(60) Provisional application No. 62/307,136, filed on Mar. 11, 2016, provisional application No. 62/307,187, filed on Mar. 11, 2016, provisional application No. 62/307,216, filed on Mar. 11, 2016.

(51) Int. Cl.
*F16J 15/3252* (2016.01)
*F23G 5/20* (2006.01)
*F23G 5/50* (2006.01)
*F16J 15/02* (2006.01)

(52) U.S. Cl.
CPC ......... *F16J 15/3252* (2013.01); *F16J 15/022* (2013.01); *F23G 5/20* (2013.01); *F23G 5/50* (2013.01)

(58) Field of Classification Search
CPC ........ F16J 15/3252; F16J 15/022; F16J 15/32; F16J 15/02; F23G 5/20; F23G 5/50; F23G 5/00

USPC ......................................................... 277/309
See application file for complete search history.

(56) References Cited

U.S. PATENT DOCUMENTS

| | | | | |
|---|---|---|---|---|
| 3,776,578 A | * | 12/1973 | Jessup | F16L 27/0812 285/181 |
| 4,154,446 A | * | 5/1979 | Usry | F16J 15/162 277/500 |
| 4,295,824 A | * | 10/1981 | Wens | F23G 5/20 34/242 |
| 5,106,105 A | * | 4/1992 | Drexler | F16J 15/004 277/369 |
| 5,277,153 A | * | 1/1994 | Kakabaker | F28G 15/00 122/379 |

(Continued)

FOREIGN PATENT DOCUMENTS

| | | |
|---|---|---|
| CN | 2128723 Y | 3/1993 |
| CN | 2718318 Y | 8/2005 |

(Continued)

*Primary Examiner* — Nathan Cumar
(74) *Attorney, Agent, or Firm* — Peacock Law P.C.; Justin R. Muehlmeyer

(57) ABSTRACT

Systems and methods for sealing a static or rotary tube to a rotary tube that is part of a thermal unit performing an airless or oxygen starved high-temperature incineration process like pyrolysis in such a way that the joining of the tubes does not interfere with the oxygen controlled processes within the rotating thermal unit tube. Embodiments comprise a seal comprising chambers for sealing material supported by rollers contacting flanges of rotating tube elements and suspended by gimbals to permit the seal to move in a transverse direction, to swing, and to rotate while maintaining the seal.

18 Claims, 7 Drawing Sheets

(56) References Cited

U.S. PATENT DOCUMENTS

| | | | | | |
|---|---|---|---|---|---|
| 5,567,380 | A | * | 10/1996 | Hoover | C21D 9/0031 266/173 |
| 8,475,351 | B2 | * | 7/2013 | Aizawa | B04B 5/0442 494/15 |
| 8,505,924 | B2 | * | 8/2013 | Dietle | F16J 15/008 277/349 |
| 2006/0131873 | A1 | * | 6/2006 | Klingbail | F16L 27/0812 285/147.1 |
| 2006/0147141 | A1 | * | 7/2006 | Harwood | F16C 33/80 384/480 |
| 2016/0334018 | A1 | * | 11/2016 | Travis | E21B 33/085 |

FOREIGN PATENT DOCUMENTS

| | | | |
|---|---|---|---|
| CN | 103773402 | A | 5/2014 |
| DE | 10028091 | A1 | 3/2001 |
| GB | 1307180 | | 2/1973 |
| GB | 2096554 | A | 10/1982 |
| GB | 2244528 | A | 12/1991 |
| JP | 2008082559 | | 4/2008 |

\* cited by examiner

MECHANICAL ROTARY HYDRAULICALLY COOLED SEAL, ROLLER SUPPORT, AND DRIVE FOR THERMAL KILN RETORTS

CROSS-REFERENCE TO RELATED APPLICATIONS

This application claims priority to U.S. Provisional Patent Application Ser. No. 62/307,136, entitled "Mechanical Rotary Hydraulically Cooled Seal, Roller Support and Drive for Thermal Kiln Retorts", filed on Mar. 11, 2016, and U.S. Provisional Patent Application Ser. No. 62/307,187, entitled "Materials Handling System for Feed Injection to Thermal Kiln Retorts", filed on Mar. 11, 2016, and U.S. Provisional Patent Application Ser. No. 62/307,216, entitled "Ash Handling System for Thermal Units", filed on Mar. 11, 2016, and the specifications thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

NAMES AND PARTIES TO A JOINT RESEARCH AGREEMENT

Not Applicable.

SEQUENCE LISTING

Not Applicable.

STATEMENT REGARDING PRIOR DISCLOSURES

Not Applicable.

COPYRIGHTED MATERIAL

Not Applicable.

BACKGROUND OF THE INVENTION

Field of the Invention (Technical Field)

The present invention relates to apparatuses and methods for sealing junctions of static and rotary tubes/pipes and junctions of rotary and rotary tubes in systems operating under high temperature and performing airless or oxygen starved incineration processes like pyrolysis.

Description of Related Art

Systems that convert waste to energy through thermal processes like pyrolysis require the processing of solids, liquids, and gases through junctions of static and rotary tubes/pipes or through junctions of two rotating tubes under high temperatures. Thermal processes often require the thermal unit of such systems to operate at temperatures up to and in excess of 200 degrees Celsius. Rotary kilns used for thermal processes ordinarily have either a static tube section from which feed material is moved into the rotary kiln for processing, a rotary tube section that operates as a kiln, and finally a second static tube section for the processed material to exit, or three rotary tube sections, a feed section, a kiln, and an exit section with two joints.

Where a static tube and rotary tube are joined to form a continuous tube, the junction of the static and rotary sections of the tube must be sealed to prevent ingress of the external atmospheres into the tubes, mixing of the external atmospheres or egress of the internal atmosphere from the tubes. Where two joined rotating tubes traverse through two static atmospheres and associated containers, the junction of the two tubes and atmospheres/containers must be sealed to prevent the two atmospheres mixing and allow the two tubes to rotate.

In systems joining static and rotary tubes that operate at high temperatures, the rotary seals commonly employed fail due to overheating, distortion and misalignment of the tubes.

What is needed is a seal to join a static or rotary tube section to the rotary tube section of a thermal unit operating under the high temperatures typical of thermal units performing an incineration process like pyrolysis or other airless or oxygen starved processes.

BRIEF SUMMARY OF THE INVENTION

The objects of the present invention are directed to systems and methods for sealing a static or rotary tube to a rotary tube that is part of a thermal unit performing an airless or oxygen starved high-temperature incineration process like pyrolysis in such a way that the joining of the tubes does not interfere with the oxygen controlled processes within the rotating thermal unit tube.

One object of the present invention is to seal the junction of a static or rotary tube to the rotating thermal unit tube in a way that prevents the ingress or egress of gases and liquids to or from the tube and allows the thermal unit tube to rotate. Embodiments of the seal of the present invention comprise rollers to support the seal while permitting one or both of the joined tubes to rotate. To seal the environment within the seal, embodiments of the present invention provide chambers within the seal in which a sealing material is placed between the seal and rotating tube elements. To ensure the stability of the seal and protect its integrity in the face of high-temperatures and distortion and misalignment in the tubes, embodiments of the seal of the present invention comprise gimbals to support and suspend the seal to allow it to move in a transverse direction, to swing, and to rotate while maintaining the seal.

Another object of the invention is to drive the rotation of the rotary tube or tubes internally to the seal while maintaining the airless or oxygen starved environment within the seal. Embodiments of the seal of the present invention comprise active rollers within the seal that drive the rotating components within the seal.

Yet another object of the present invention is to provide a seal that is easily maintainable. Embodiments of the seal of the present invention are modular in construction, permitting access to components of the seal without having to move, modify, disassemble, or alter the tubes. Certain components that may require maintenance more often, for example the sealing material, may be accessed and replaced by removing only a single plate.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF EMBODIMENTS OF THE INVENTION

Figure 1A:
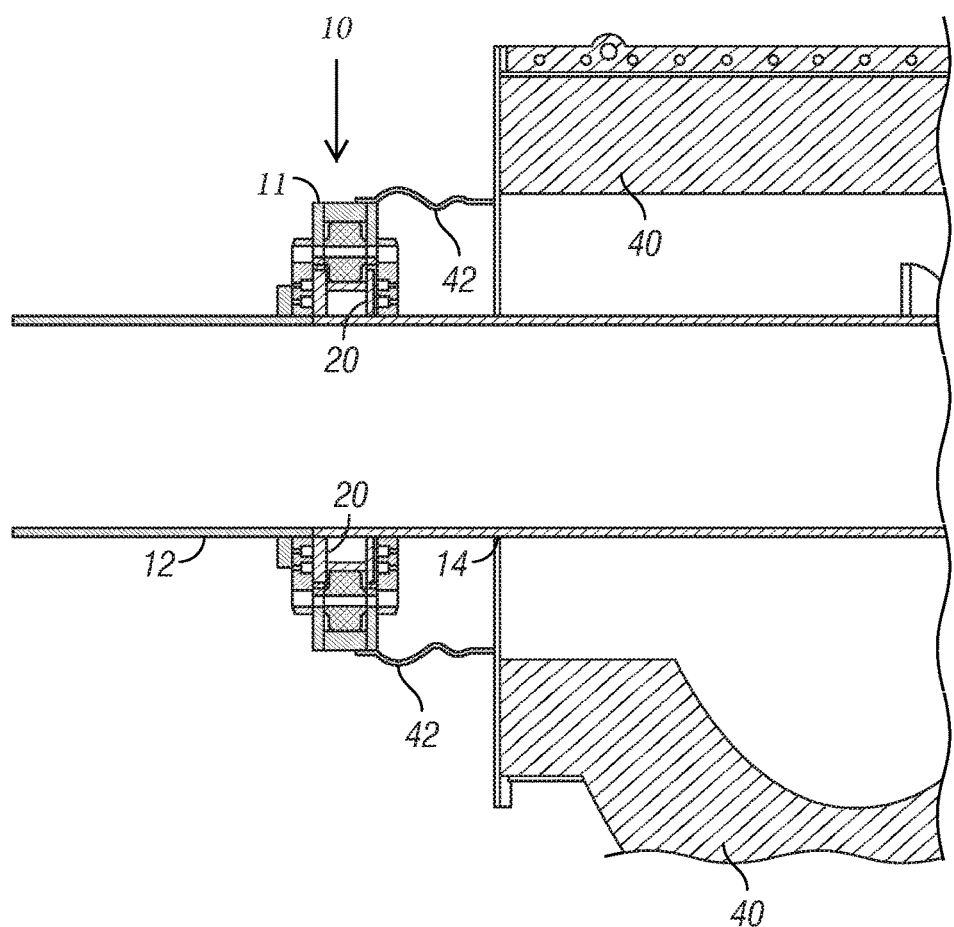
FIG. 1A is a schematic illustrating the cross section of an embodiment of the seal of the present invention sealing a static tube to the thermal unit rotary tube.
Figure 1B:
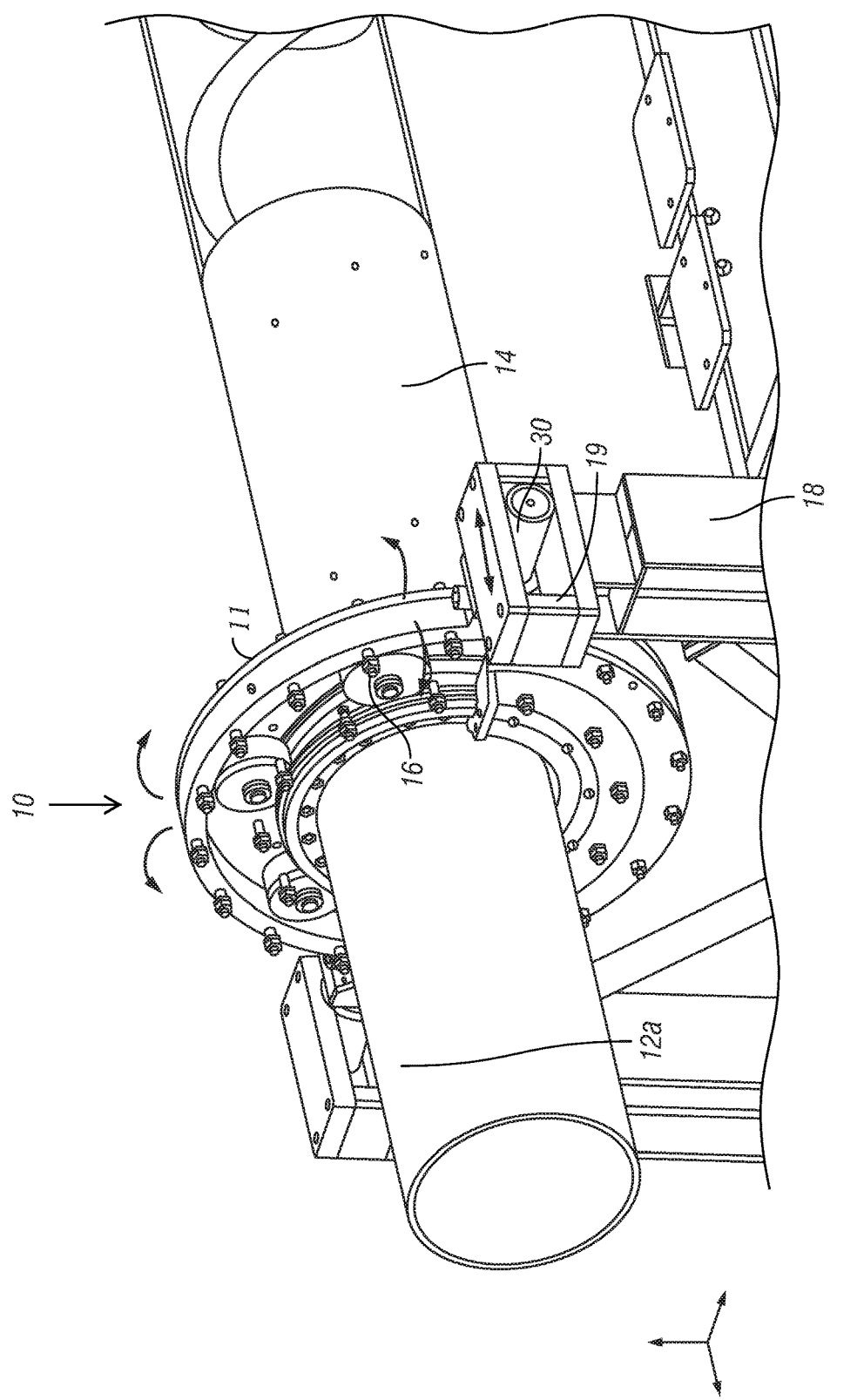
FIG. 1B is a schematic illustrating the general arrangement and partial cross section of an embodiment of the seal of the present invention from a perspective view.
Figure 2A:
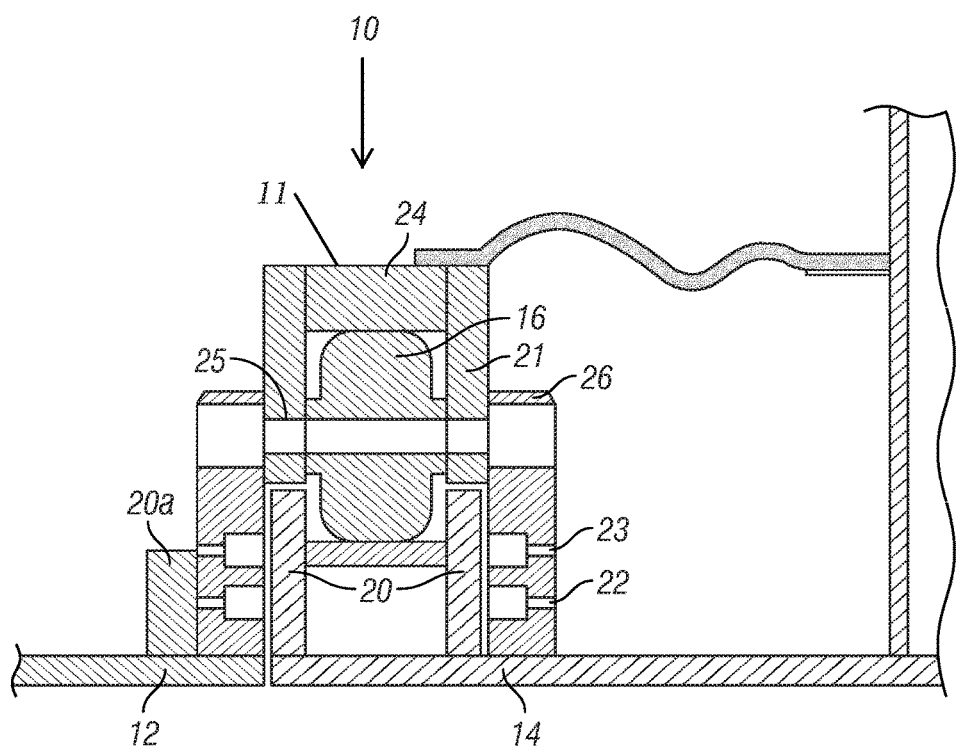
FIG. 2A is a schematic illustrating the cross section of an embodiment of the seal of the present invention sealing a static tube to a thermal unit rotary tube from a view perpendicular to the axis of the tubes.
Figure 2B:
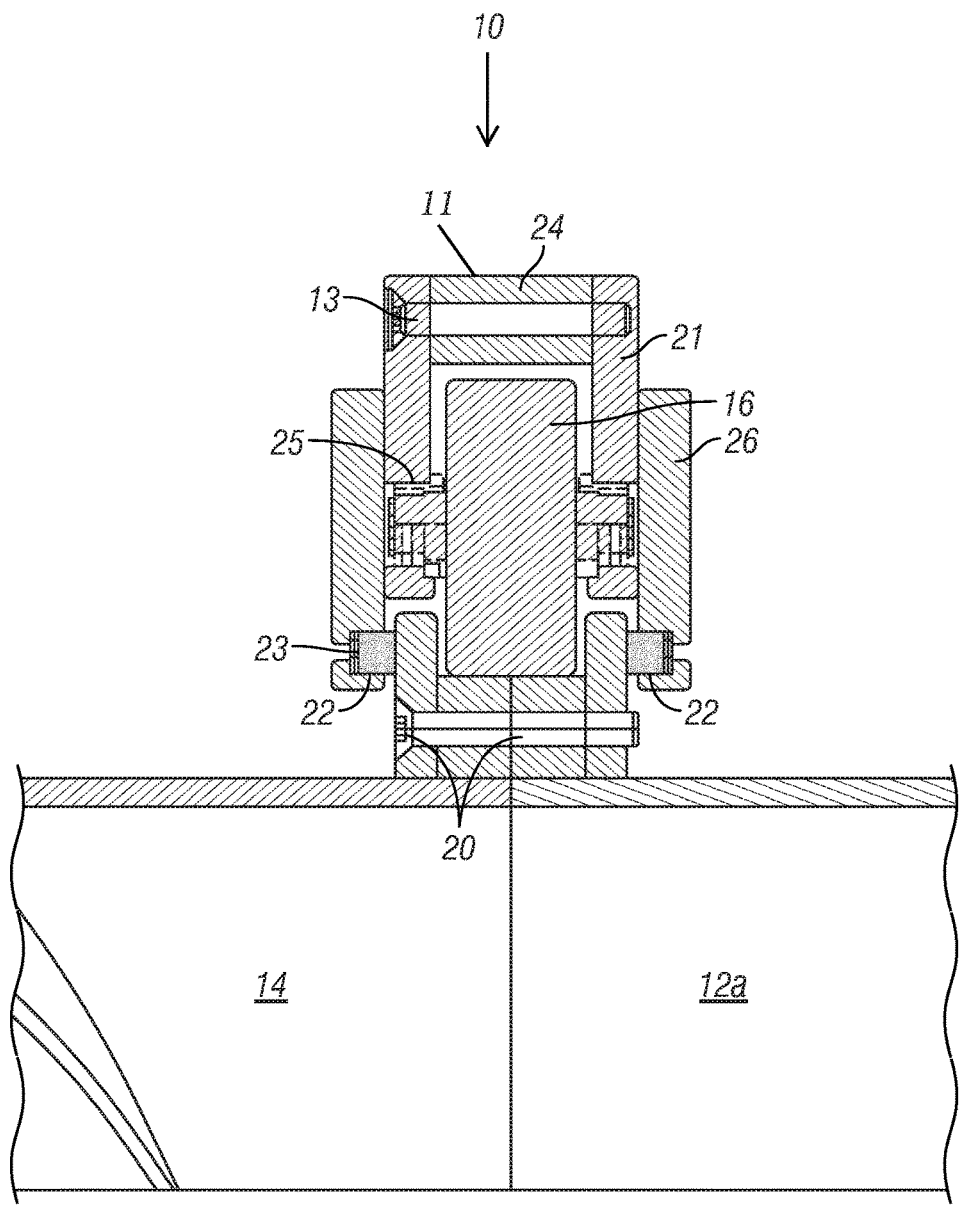
FIG. 2B is a schematic illustrating the cross section of an embodiment of the seal of the present invention sealing a rotary tube to a thermal unit rotary tube from a view perpendicular to the axis of the pipes.
Figure 3:
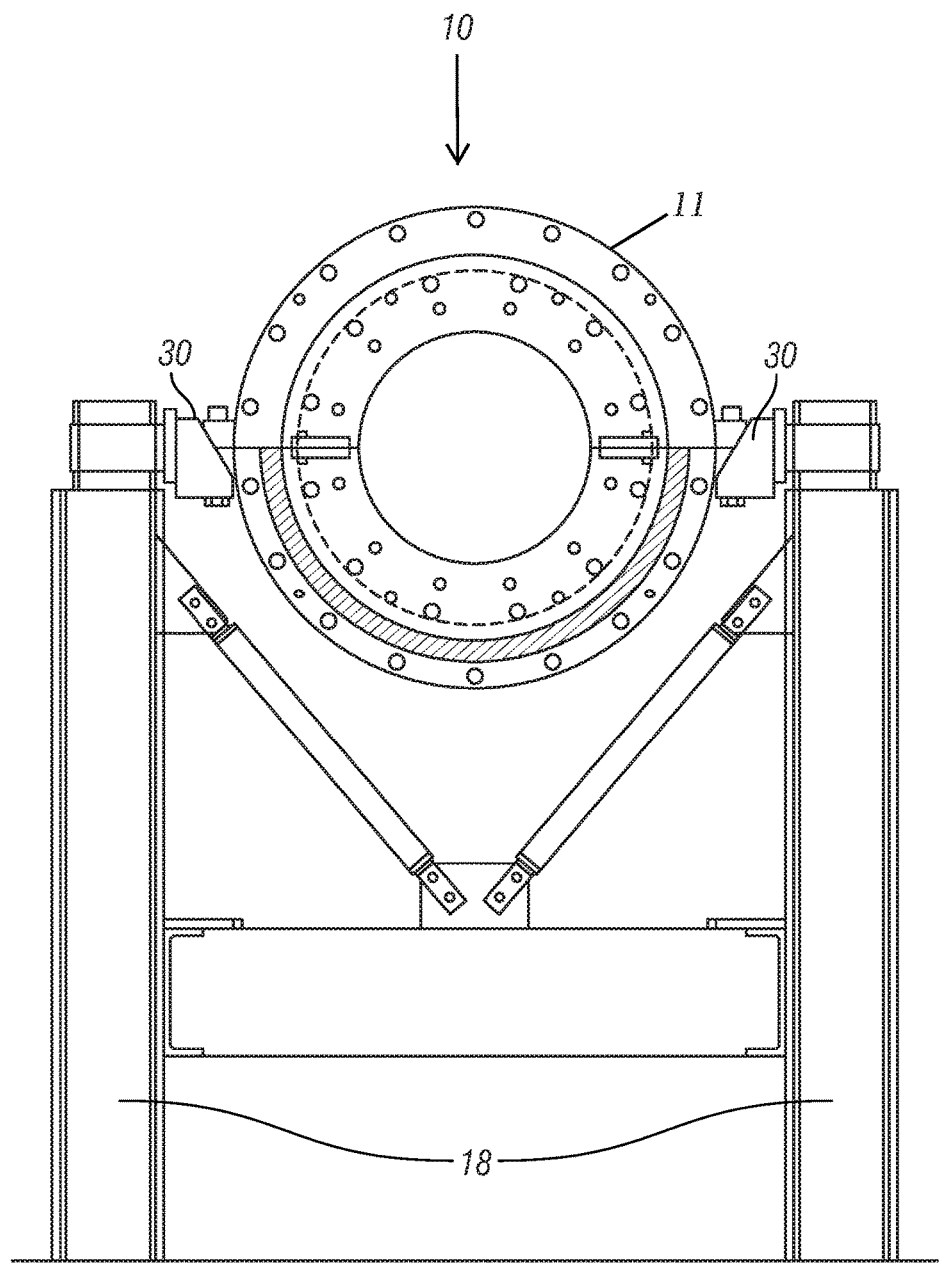
FIG. 3 is a schematic illustrating the oil level within an embodiment of the seal of the present invention from a view along the axis of the tubes.
Figure 4:
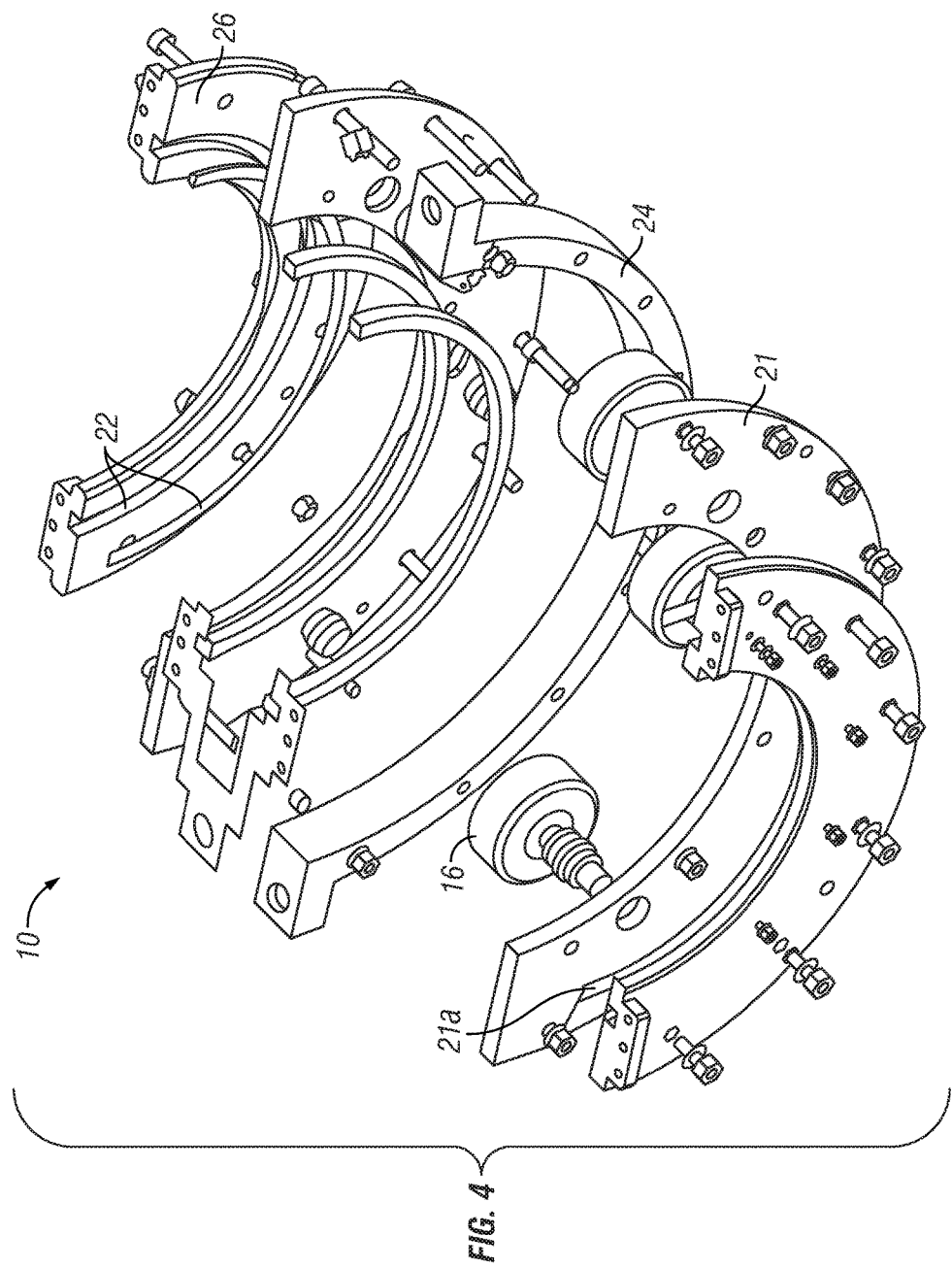
FIG. 4 is a schematic illustrating an exploded expansion view of a portion of an embodiment of the seal of the present invention.

Referring to the figures, embodiments of the present invention comprise a seal 10 capable of joining static tube section 12 or a rotary tube section 12a to the rotary tube section 14 of a thermal unit performing an airless or oxygen starved high-temperature incineration process like pyrolysis. For example, in systems that convert waste material or other material to energy using the incineration process of pyrolysis, static tube section 12 and rotary section 12a may be a feeder tube through which processed material passes, and rotary tube section 14 may be a rotary kiln in which pyrolysis of the waste occurs. FIG. 1A illustrates a cross sectional view of an embodiment of seal 10 joining a static tube section 12 and the rotating tube section 14 that passes through thermal unit body 40. FIG. 1B illustrates the general arrangement and partial cross section of an embodiment of seal 10 joining a rotary tube section 12a to the thermal unit rotary tube section 14. FIG. 2A illustrates an embodiment of seal 10 joining a static tube 12 with the thermal unit rotary tube 14. FIG. 2B illustrates an embodiment of seal 10 joining rotary tube 12a with the thermal unit rotary tube 14. FIG. 3 illustrates the oil level (shaded with lines) in an embodiment of seal 10 from a view along the axis of the pipes. FIG. 4 illustrates an embodiment of seal 10 from an exploded view.

Preferably, embodiments of the present invention comprise an atmosphere zone formed by flexible steel bellows 42 that extend from the top of seal body 11 to the thermal unit body 40, for example as illustrated in FIG. 1A. Such atmosphere zones assist in containing the high-temperature environment of the thermal unit 40. In some embodiments, atmosphere zones may be formed of any material capable of containing the high temperature atmosphere surrounding thermal units and may extend from other parts of seal 10.

Embodiments of the present invention comprise gimbals 18 on both sides of seal body 11 to suspend the seal to maintain the seal even where temperatures and/or rotation may distort or misalign tubes 12, 12a and 14. Preferably, as illustrated in FIGS. 1B and 3, each gimbal 18 comprises a post extending from the ground or a support structure to a height about midway the height of seal body 11, and comprises other support structures that connect each gimbal 18 to the corresponding gimbal 18 on the other side of seal body 11 for further support. Gimbals 18 may be of any material capable of supporting the weight of seal body 11, including but not limited to a metal. Embodiments of gimbal 18 comprise a seal extension receiver 19 that receives support extension 30 of seal body 11. Preferably, seal extension receiver 19 comprises a rectangular opening in which support extension 30 of seal body 11 is inserted. In this way, gimbals 18 support seal body 11 while allowing seal body 11 to move in a transverse direction, to swing, and to rotate as illustrated by the directional arrows in FIG. 1. The supporting cylindrical journal section of the gimbal is attached to the seal body 11 and allows rotary movement/swing of the seal body 11 as well as sliding horizontally/transversely within the gimbal body 30. Some embodiments of the present invention may employ other means for supporting seal 10, including but not limited to a support structure hanging from a structure above seal 10.

Embodiments of the seal 10 of the present invention comprise flanges 20 or 20a to provide a surface attached to the joined tubes that the seal may contact. Preferably, as illustrated in FIGS. 1A, 2A, and 2B, flanges 20 attach to rotary tube sections 12a and 14 by welding material to the end of rotary tubes 12a and 14 so that flanges 20 rotate with tubes 12a and 14. In the embodiment of seal 10 illustrated in FIG. 2B joining a rotary tube 14 to a rotary tube 12a, the flanges 20 on the ends of both joined rotary tubes 14 and 12a are bolted together by bolts 13. Rollers 16 support the seal above rotating flanges 20 within seal body 11 and the sealing material in chambers 22 seals the environment within seal body 11 by filling the space between flanges 20 and components of the seal body 11 with a material that prevents the ingress and egress of liquid or air. As illustrated in FIG. 2A, flanges 20a are welded near the end of static tube section 12 and fixed to the seal body 11. Static tube 12 will be held substantially static by flange 20a being bolted to seal body 11 but not to the flanges 20 of rotary tube 14. Flanges 20 but not flanges 20a provide a flat sealing surface and rotate against the sealing material in chambers 22. In some embodiments, flanges 20 and 20a can be attached to the tube sections by other methods including but not limited to screw thread, pressing together, or heat-shrink.

Embodiments of the seal 10 comprise rollers 16 within the body 11 of seal 10 that support the mating faces of the static tube section 12 and rotary tube sections 12a and 14 and allow the rotary tube sections 12a and 14 to rotate. Preferably, as best illustrated in FIGS. 2A, 2B, and 4, bearings 16 rotate about a central spindle mounted into two bearings 25 supported by bearing support plate 21 within seal body 11. Rollers 16 run within the valley formed by the flanges 20. Surfaces of spacer ring 24 and flanges 20 form contact surfaces for rollers 16. Preferably, the rollers 16 comprise a machined high temperature wear resistant wheel or roller.

Embodiments of the seal 10 comprise a sealing material placed within chambers 22 that prevents the ingress and egress of liquid and air. Preferably, a gland packing material is placed within chambers 22 between each gland plate 26 and each bearing plate 21, sealing the spaces within seal body 11. As illustrated in FIGS. 1A, 2A, 2B, and 4, gland packing chambers 22 form a double ring within seal body 11, the packing within gland packing chambers 22 embedded within gland plate 26 adjustable by grub screws 23 disposed on, into, or around chambers 22. The packing can then be easily accessed to be replaced by removing a single plate, the gland plate 26, which can be removed by unbolting it from the other components of seal body 11. The seal body 11 will support the tubes on the rollers 16 while the gland plate 26 is removed and the packing is accessed. In this way, gland packing 22 may be replaced without need for removing seal body 11 from tube sections 12 and 14. As best seen in FIG. 4, bearing support plate 21 may comprise a gland compression ring 21a for applying pressure to gland packing. Embodiments of the seal 10 may comprise any number of rings of gland packing, or in shapes other than rings. Rings 22 are preferably continuous to surround the entire circumference of the tubes 12, 12a, and 14, however in some embodiments the rings are not continuous but are broken. Preferably, gland packing 22 is of graphite, but some embodiments may comprise gland packing of any appropriate material.

Figure 5:
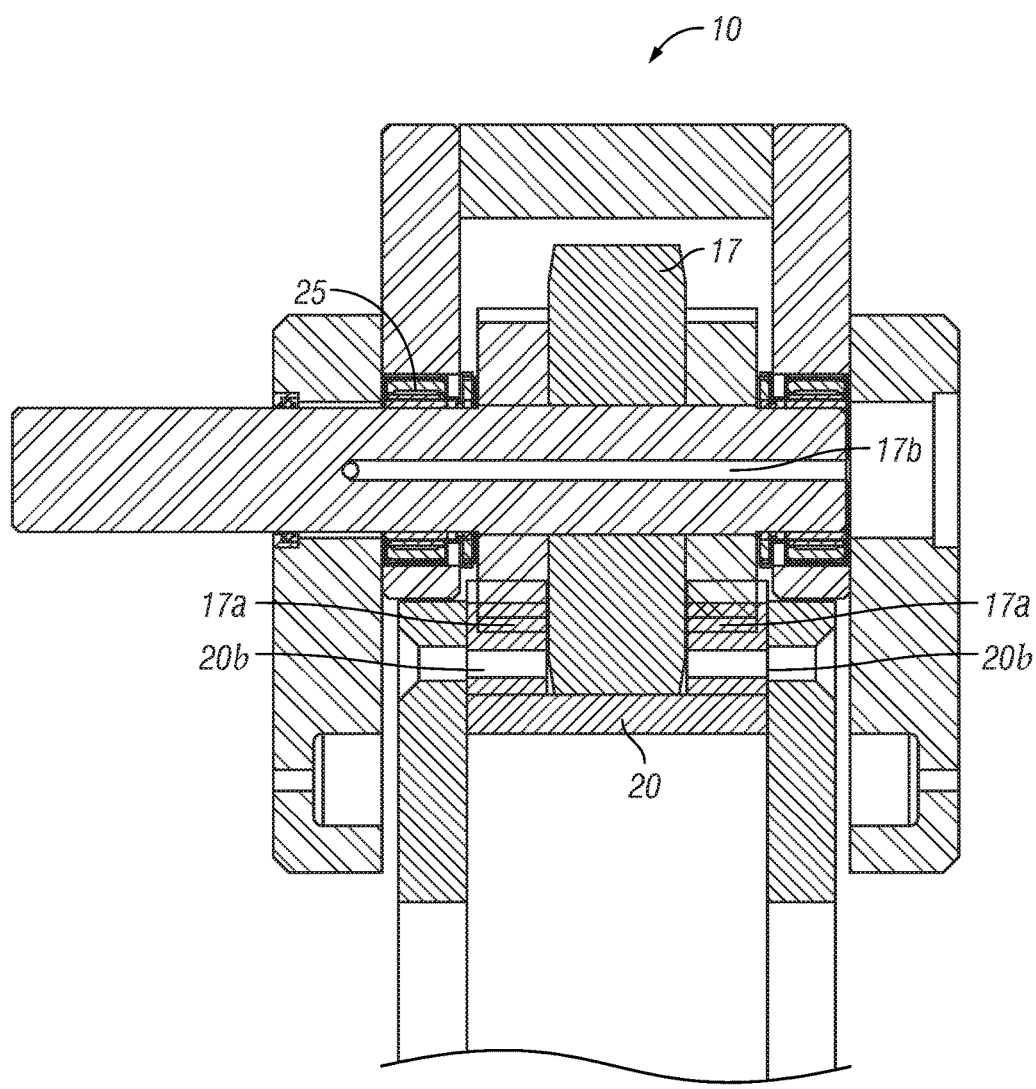
FIG. 5 is a schematic illustrating the cross section of an embodiment of the seal of the present invention comprising an active roller drive system.

Embodiments of the present invention comprise a drive system to drive rotary tube 14. The drive system may be internal or external to seal body 11. Preferably, rotary tubes 12a and 14 are driven by gearing external to and independent of seal body 11, like for example, driving rotary tubes 12a or 14 by chain and sprocket. This preferred embodiment makes the seal 10 easier to construct because rollers 16 are passive. However, in some embodiments of the present invention, seal body 11 comprises a drive system internal to it in which at least one of the rollers 16 is not passive but is active/driven, allowing the entire retort to be rotated internally without need to break the airtight seal. For example, as illustrated in FIG. 5, active roller 17 comprises a spur pinion drive gear with drive teeth 17a that mesh with coordinating teeth 20b embedded or cut into the inner face of flange 20. This active drive system roller 17 is connected to a drive sprocket on the end of the roller spindle 17b passing through bearing 25 and mounted externally to the seal body 11. This active roller system negates the need for a separate sprocket on rotary tube 12a or 14.

Embodiments of the present invention comprise methods and apparatuses for cooling and lubricating seal 10. Referring to FIGS. 2A, 2B, and 3, spaces exist within seal body 11 formed by the structures described herein. Preferably, seal 10 is flood-cooled by oil lubricant because oil lubricant both cools seal 10 as well as lubricates the graphite gland packing 22 to minimize wear and increase effectiveness of the sealing face. Other embodiments of the present invention may flood-cool seal 10 using other compositions. Referring to FIG. 3, oil lubricant is preferably inserted into seal body 11 through an oil feed near the top of seal body 11 and drained through an oil outlet near the bottom of seal body 11.

Embodiments of the present invention further comprise methods and apparatuses for adjusting gland packing material 22 to allow for wear and expansion of the gland packing material 22. Preferably, when gland packing material 22 wears, it is adjustable by spring-loaded indent grub screws 23 placed in, on, or around chambers 22, but may be adjusted any means, including but not limited to by hydraulic pressure, gas pressure, or grease pressure.

One skilled in the art will realize that other embodiments of the present invention, not explicitly taught in the preceding embodiments, can likewise achieve the desired goal of the present invention. Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A sealing system for sealing the junction of an end of a first static or rotary tube having a circumference to an end of a second rotary tube, the second tube having a circumference and attached to or functioning as a thermal unit, the sealing system comprising:
   at least one rotary flange attached continuously along the outer circumference of the junction end of the rotary tube or rotary tubes;
   at least one plate continuous with the outer circumference of the junction end of the first and second tubes, said at least one plate comprising surfaces in coordination with said at least one rotary flange;
   at least one roller mounted to said at least one plate, and said at least one roller in contact with said at least one rotary flange;
   wherein said at least one rotary flange comprises an interior a surface in contact with said at least one roller wherein said at least one roller can roll as said at least one rotary flange rotates;
   wherein said at least one plate at least partially surrounds said at least one rotary flange and said at least one roller; and
   sealing material attached to said at least one plate, contacting said at least one rotary flange to create a sealed environment between said at least one plate and said at least one rotary flange continuous with the outer circumference of the junction end of the rotary tube or rotary tubes while said rotary flange rotates.

2. The system of claim 1 wherein said at least one rotary flange is attached to the rotary tube or rotary tubes flush with the end of the rotary tube or rotary tubes.

3. The system of claim 1 further comprising at least one static flange attached continuously along the outer circumference of the junction end of a static tube at or near the end of the static tube.

4. The system of claim 3 wherein said at least one plate is attached to said at least one static flange.

5. The system of claim 1 wherein said at least one plate comprises a surface in contact with said at least one roller.

6. The system of claim 1 wherein said at least one rotary flange is shaped to at least partially surround said at least one roller.

7. The system of claim 1 wherein one of said at least one plate is removable from said at least one plate or said rotary flange without altering the position of the first or second tubes.

8. The system of claim 1 wherein said at least one plate comprises at least one chamber for supporting said sealing material.

9. The system of claim 1 further comprising an active roller to drive the rotary tube or rotary tubes, said active roller comprising a drive gear.

10. The system of claim 9 wherein said surface of said at least one rotary flange comprises at least one drive gear track for coordinating with said drive gear.

11. The system of claim 1 further comprising a suspension system comprising gimbals and wherein said at least one plate is supported by said gimbals.

12. The system of claim 11 wherein said at least one plate comprises at least one extension arm supported by said gimbals, and said gimbals are shaped to receive said extension arm to allow said at least one plate to move in a transverse direction, to swing, and to rotate.

13. A method of sealing the junction of an end of a first static or rotary tube having a circumference to an end of a second rotary tube, the second tube having a circumference and attached to or functioning as a thermal unit, the method of sealing comprising the steps of:
   attaching at least one rotary flange continuously along the outer circumference of the junction end of the rotary tube or rotary tubes;
   forming at least one plate continuous with the outer circumference of the junction end of the first and second tubes, said at least one plate comprising surfaces in coordination with said at least one rotary flange;
   mounting at least one roller to said seal body at least one plate, and said at least one roller in contact with said at least one rotary flange, wherein said at least one rotary flange comprises a surface in contact with said at least one roller wherein said at least one roller can roll as said at least one rotary flange rotates, and wherein said at least one plate at least partially surrounds said at least one rotary flange and said at least one roller; and
   attaching sealing material to said at least one plate such that said sealing material is in substantially continuous contact with at least one rotary flange, thereby creating a sealed environment between said at least one plate and said at least one rotary flange continuous with the outer circumference of the junction end of the rotary tube or rotary tubes while said rotary flange rotates.

14. The method of claim 13 further comprising the step of attaching at least one static flange continuously along the outer circumference of the junction end of a static tube.

15. The method of claim 13 wherein said at least one plate is attached to at least one static flange.

16. The method of claim 13 further comprising the step of supporting said at least one plate using gimbals, said gimbals adapted to allow said at least one plate to move in a transverse direction, to swing, and to rotate.

17. The method of claim 13 further comprising removing one plate of said at least one plate and removing said sealing material from said at least one plate.

18. The method of claim 13 wherein said sealing material is attached to said at least one plate in the shape of a continuous ring.

* * * * *

UNITED STATES PATENT AND TRADEMARK OFFICE
CERTIFICATE OF CORRECTION

| | |
|---|---|
| PATENT NO. | : 10,428,952 B1 |
| APPLICATION NO. | : 15/457636 |
| DATED | : October 1, 2019 |
| INVENTOR(S) | : Keith Denton Nair et al. |

It is certified that error appears in the above-identified patent and that said Letters Patent is hereby corrected as shown below:

Column 6, Line 19, cancel the text beginning with "1. A sealing system" to and ending "flange rotates" in Column 6, Line 46, and insert the following text:

--1. A sealing system for sealing the junction of an end of a first static or rotary tube having a circumference to an end of a second rotary tube, the second tube having a circumference and attached to or functioning as a thermal unit, the sealing system comprising:
  at least one rotary flange attached continuously along the outer circumference of the junction end of the rotary tube or rotary tubes;
  at least one plate continuous with the outer circumference of the junction end of the first and second tubes, said at least one plate comprising surfaces in coordination with said at least one rotary flange;
  at least one roller mounted to said at least one plate, and said at least one roller in contact with said at least one rotary flange;
  wherein said at least one rotary flange comprises a surface in contact with said at least one roller wherein said at least one roller can roll as said at least one rotary flange rotates;
  wherein said at least one plate at least partially surrounds said at least one rotary flange and said at least one roller; and
  sealing material attached to said at least one plate, contacting said at least one rotary flange to create a sealed environment between said at least one plate and said at least one rotary flange continuous with the outer circumference of the junction end of the rotary tube or rotary tubes while said rotary flange rotates.--

Column 7, Line 16, cancel the text beginning with "13. A method of sealing" to and ending "flange rotates" in Column 8, Line 13, and insert the following text:

--13. A method of sealing the junction of an end of a first static or rotary tube having a circumference to an end of a second rotary tube, the second tube having a circumference and attached to or functioning as a thermal unit, the method of sealing comprising the steps of:
  attaching at least one rotary flange continuously along the outer circumference of the junction end of the rotary tube or rotary tubes;

Signed and Sealed this
Twenty-eighth Day of January, 2020

Andrei Iancu
*Director of the United States Patent and Trademark Office* forming at least one plate continuous with the outer circumference of the junction end of the first and second tubes, said at least one plate comprising surfaces in coordination with said at least one rotary flange;

mounting at least one roller to said at least one plate, and said at least one roller in contact with said at least one rotary flange, wherein said at least one rotary flange comprises a surface in contact with said at least one roller wherein said at least one roller can roll as said at least one rotary flange rotates, and wherein said at least one plate at least partially surrounds said at least one rotary flange and said at least one roller; and attaching sealing material to said at least one plate such that said sealing material is in substantially continuous contact with at least one rotary flange, thereby creating a sealed environment between said at least one plate and said at least one rotary flange continuous with the outer circumference of the junction end of the rotary tube or rotary tubes while said rotary flange rotates.--